United States Patent
Hall, Jr. et al.

(10) Patent No.: US 10,800,532 B2
(45) Date of Patent: Oct. 13, 2020

(54) PRIVACY PARTITION, SYSTEM AND METHOD

(71) Applicant: The Boeing Company, Chicago, IL (US)

(72) Inventors: Curtis L. Hall, Jr., Moncks Corner, SC (US); Melissa Holt Lutz, Charleston, SC (US); Tania D. Hall, Moncks Corner, SC (US)

(73) Assignee: THE BOEING COMPANY, Chicago, IL (US)

( * ) Notice: Subject to any disclaimer, the term of this patent is extended or adjusted under 35 U.S.C. 154(b) by 588 days.

(21) Appl. No.: 15/290,082

(22) Filed: Oct. 11, 2016

(65) Prior Publication Data

US 2018/0099753 A1    Apr. 12, 2018

(51) Int. Cl.
*B64D 11/06*    (2006.01)
*B60N 2/90*    (2018.01)

(52) U.S. Cl.
CPC ............ *B64D 11/0606* (2014.12); *B60N 2/90* (2018.02)

(58) Field of Classification Search
CPC ............. B64D 11/0606; B64D 11/0604; A61J 9/0661; A45B 3/00; A47C 7/36; A47D 1/00; A47D 7/04; B60N 2/90; B60N 2/00; B60N 2/91; B60N 2/6009; B60N 2002/905; A63B 2210/54
USPC ........... 244/118.6, 118.5; 43/113; 297/184.1, 297/184.11, 184.12, 184.13, 184.14, 297/184.15, 184.16
See application file for complete search history.

(56) References Cited

U.S. PATENT DOCUMENTS

| | | | | |
|---|---|---|---|---|
| 928,821 | A | * | 7/1909 | Taylor ...................... A47D 7/04 5/99.1 |
| 2,805,704 | A | * | 9/1957 | Avseev .................... A47D 7/04 297/8 |

(Continued)

FOREIGN PATENT DOCUMENTS

| DE | 19541567 C1 | 1/1997 |
|---|---|---|
| DE | 102006044408 A1 | 3/2008 |

(Continued)

OTHER PUBLICATIONS

European Patent Office; Extended European Search Report; European Patent Application No. 17194433.3; dated Feb. 13, 2018.

(Continued)

*Primary Examiner* — Richard R. Green
(74) *Attorney, Agent, or Firm* — Parsons Behle & Latimer (57) ABSTRACT

A privacy partition having a frame covered in fabric having a collapsed configuration and an expanded configuration that defines a perimeter. The privacy partition include a first connector that selectively connects a portion of the privacy partition to a portion of a seat. The first connector may connect the privacy partition to an aft seat and the privacy partition may include a second connect that selectively connects a portion of the privacy partition to a portion of a fore seat. The privacy partition may be flexible to remain attached to the fore and aft seat in any degree of recline. The privacy partition may be selectively connected to a slip cover positioned over the seat back of a seat. The privacy partition may be selectively connected to slip covers over the seatback of fore and aft seats. The frame of the privacy partition may be a flexible wire.

20 Claims, 5 Drawing Sheets

(56) References Cited

U.S. PATENT DOCUMENTS

| | | | | |
|---|---|---|---|---|
| 3,037,216 A * | 6/1962 | Stringer | B60N 2/2854 | 4/572.1 |
| 3,152,835 A * | 10/1964 | McKie | B60N 2/90 | 297/423.1 |
| 3,574,872 A * | 4/1971 | Mattila | A47D 13/02 | 5/94 |
| 3,735,430 A * | 5/1973 | Platz | A47D 7/04 | 5/118 |
| 3,784,990 A * | 1/1974 | Elisofon | A47D 7/04 | 5/94 |
| 3,834,756 A * | 9/1974 | Grell | B62B 5/0013 | 296/136.1 |
| 4,232,413 A * | 11/1980 | Mongault | A47D 7/04 | 5/114 |
| 4,583,779 A * | 4/1986 | Myers | B60N 2/6009 | 135/96 |
| 4,676,376 A * | 6/1987 | Keiswetter | B60N 2/60 | 206/449 |
| 4,754,987 A * | 7/1988 | Williams | A61G 5/00 | 280/304.1 |
| 4,807,927 A * | 2/1989 | Livick | B60N 2/2839 | 280/727 |
| 4,915,120 A | 4/1990 | Ziolkowski | | |
| 5,007,674 A * | 4/1991 | Franc | A47D 15/00 | 297/184.13 |
| 5,154,477 A * | 10/1992 | Lacy | A47C 7/383 | 297/397 |
| 5,188,421 A * | 2/1993 | Arseneault | B60N 2/6009 | 297/182 |
| 5,538,319 A * | 7/1996 | DiMurro | B60N 2/2839 | 211/106 |
| 5,542,732 A * | 8/1996 | Pollman | B62B 9/142 | 296/77.1 |
| 5,730,490 A * | 3/1998 | Mortenson | A47D 13/02 | 297/184.11 |
| 5,795,018 A * | 8/1998 | Schumacher | B64D 11/0015 | 244/118.5 |
| 5,806,925 A * | 9/1998 | Hanley | A47C 31/113 | 297/219.1 |
| 5,975,558 A * | 11/1999 | Sittu | B62B 9/142 | 280/47.38 |
| 6,082,386 A * | 7/2000 | Zheng | A63B 9/00 | 135/119 |
| 6,182,931 B1 * | 2/2001 | Richard | B60N 2/6009 | 108/44 |
| 6,296,002 B1 * | 10/2001 | Tashchyan | A47C 4/283 | 135/115 |
| 6,296,004 B1 * | 10/2001 | Gordon | B62B 9/14 | 135/115 |
| 6,601,798 B2 * | 8/2003 | Cawley | B60N 2/0224 | 244/118.6 |
| 6,644,736 B2 * | 11/2003 | Nguyen | B64D 11/06 | 160/84.07 |
| 6,726,277 B1 * | 4/2004 | Samaha | A47C 7/66 | 160/370.21 |
| 6,908,148 B2 * | 6/2005 | Wang | B60N 2/26 | 297/184.11 |
| 7,213,878 B2 * | 5/2007 | Delapaz | B62B 9/142 | 297/184.1 |
| 7,261,375 B2 * | 8/2007 | Godshaw | B60N 2/6009 | 119/28.5 |
| 7,530,635 B2 * | 5/2009 | Schramek-Flye | A47D 1/103 | 297/17 |
| 7,565,910 B2 * | 7/2009 | Alexakis | A47D 13/105 | 135/117 |
| 7,832,037 B2 * | 11/2010 | Overton | B60N 3/001 | 5/655 |
| 7,963,596 B2 * | 6/2011 | Efthimiou | A47C 7/66 | 297/184.1 |
| 8,403,411 B2 * | 3/2013 | Boyer, Jr. | B64D 11/06 | 297/217.3 |
| 8,851,568 B2 * | 10/2014 | Funk | B60N 2/3015 | 297/245 |
| 9,566,887 B2 * | 2/2017 | Chapman | B60N 2/6018 | |
| D785,372 S * | 5/2017 | Bosket, Sr. | D6/611 | |
| 9,930,967 B2 * | 4/2018 | Gilbert | A47C 7/66 | |
| 10,166,902 B2 * | 1/2019 | Cayzer | B64D 11/0646 | |
| 2006/0220424 A1 | 10/2006 | Fargason, III | | |
| 2009/0039685 A1 * | 2/2009 | Zernov | A47C 7/66 | 297/16.2 |
| 2009/0295128 A1 | 12/2009 | Nagelski et al. | | |
| 2011/0163579 A1 * | 7/2011 | Watson | B60N 2/26 | 297/188.01 |
| 2011/0181078 A1 * | 7/2011 | Kelly | A47C 4/286 | 297/16.1 |
| 2013/0320720 A1 * | 12/2013 | Steinmetz | A47C 7/62 | 297/219.1 |
| 2018/0055239 A1 * | 3/2018 | O'Doherty | B64D 11/0641 | |

FOREIGN PATENT DOCUMENTS

| | | |
|---|---|---|
| DE | 102007050139 A1 | 4/2009 |
| WO | WO8201984 | 6/1982 |

OTHER PUBLICATIONS

European Patent Office; Communication Pursuant to Article 94(3) EPC for Application No. 17194433.3 dated May 7, 2020.

* cited by examiner

PRIVACY PARTITION, SYSTEM AND METHOD

BACKGROUND

Field of the Disclosure

The embodiments described herein relate to a system and method for temporary privacy, also referred herein as a privacy partition, in-flight mothers room, or privacy shade, which may be used to provide privacy for a person in a seat. The privacy partition may be quickly collapsed for storage and may be quickly expanded to provide privacy for a passenger during travel via aircraft, train, bus, boat, and/or other methods of transportation, in places with public seating, or the like.

Description of the Related Art

When traveling on public transportation a passenger may not be afforded the privacy desired. For example, a mother traveling with an infant may need to breast feed the infant while in transit on a bus, aircraft, train, and/or boat. Often public transportation vehicles do not provide a nursing mother's room for breast feeding requiring the mother to try to discreetly feed the infant while seated among strangers, which may be uncomfortable and/or stressful. Traveling with a child on public transportation may be stressful. For example, the large number of stimuli on public transportation to the conversations and/or activities of adjacent passengers may be disconcerting to certain children such as a child with special needs.

Some passengers may prefer to rest or sleep while traveling on public transportation. However, a passenger may not feel at ease in order to sleep or rest while sitting next to other passengers if the passengers are strangers. Other disadvantages may exist concerning the lack of privacy for a passenger traveling on public transportation. Similar situations may arise in places with public seating such as waiting rooms, boarding areas, restaurants, theaters, stadiums, or the like.

SUMMARY

The present disclosure is directed to an apparatus, method, and/or system that overcomes some of the problems and disadvantages discussed above.

One embodiment of the present disclosure is a privacy partition comprising a frame covered in fabric, the frame having a collapsed configuration and an expanded configuration, wherein in the expanded configuration the frame defines a perimeter. The privacy partition comprises at least a first connector, wherein the at least the first connector selectively connects a portion of the privacy partition to a portion of a seat. The at least the first connector may comprise a hook and loop fastener, a snap, an elastic strap, a fabric tie, a clamp, a string, a button, a button hole, a clip, a buckle, a clasp, a ring, a slide, a d-ring, a side-release buckle, or a cord.

The privacy partition may comprise at least a second connector, wherein the seat connected by the at least first connector is an aft seat and wherein the at least second connector selectively connects a portion of the privacy partition to a portion of a fore seat, the frame covered in fabric extending between the aft seat and the fore seat. The privacy partition may be flexible to remain attached to the fore and aft seats in any degree of recline of the fore and aft seats. The privacy partition may comprise a first slip cover positioned over a seatback of the seat, wherein the at least first connector selectively connects the portion of the privacy partition to the first slip cover. The first slip cover may be positioned over a seatback of an aft seat. The privacy partition may comprise at least a second connector and a second slip cover positioned over a seatback of a fore seat, wherein the at least the second connector selectively connects a portion of the privacy partition to the second slip cover.

The first slip cover may comprise a cutout configured to permit access to a tray table latch. The frame may comprise a wire. The frame cover in fabric may comprise a back, a top, a front, a left side, and a right side. The privacy partition may comprise at least one selectively closable opening in the top, at least one selectively opening in the left side, and at least one selectively closeable opening in the right side. The privacy partition may comprise at least one selectively closeable opening in the front configured to permit ingress of a tray table from an adjacent seat. The privacy partition may comprise an aesthetic pattern on at least an interior surface of the fabric. The at least the first connector may be connected to an interior portion of the privacy partition or may be connected to an exterior portion of the privacy partition. The seat may be a seat on an airplane, train, bus, or a boat or may be a seat in a public area such as waiting rooms, boarding areas, restaurants, theaters, stadiums, or the like.

One embodiment of the present disclosure is a privacy partition system for an aircraft. The system comprises an aft seat, a fore seat, and a frame covered in fabric that has a collapsed configuration and an expanded configuration, wherein in the expanded configuration the fabric extends between the aft seat and the fore seat to define a perimeter for a privacy partition that is selectively connect to both the aft seat and the fore seat. The frame may be flexible to remain connected to the fore and aft seats in any degree of recline of the fore and aft seats. The system may comprise a first slip cover over the aft seat and a second slip cover over the fore seat, wherein the privacy partition connects to the aft seat via the first slip cover and wherein the privacy partition connects to the fore seat via the second slip cover.

One embodiment of the present disclosure is a method comprising coupling fabric over a frame, the frame having an expanded configuration that defines a perimeter and a collapsed configuration, wherein the frame with the fabric in the expanded configuration provides a privacy partition. The method comprises coupling at least a first connector to the privacy partition to connect the privacy partition to a first seat. The method may comprise coupling at least a second connector to the privacy partition to connect the privacy partition to a second seat, wherein the privacy partition extends between the first seat and the second seat.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

Figure 1:
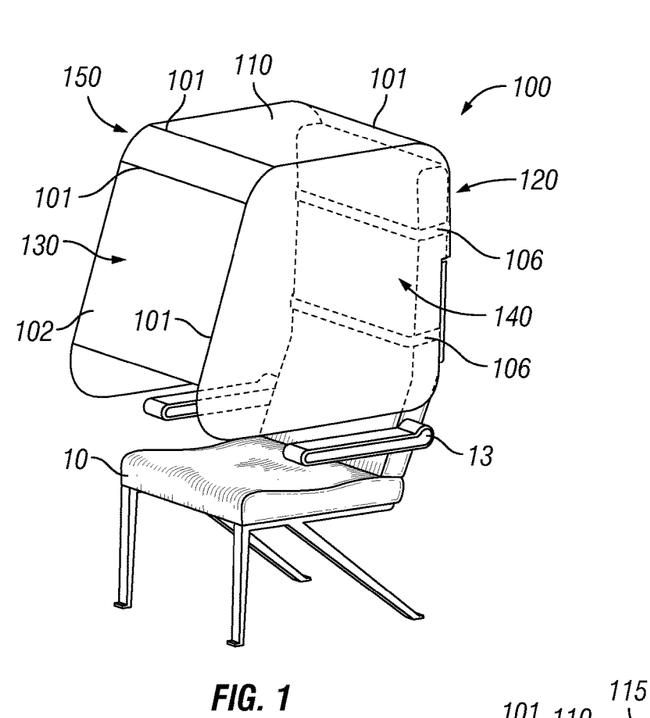
FIG. 1 shows a perspective view of one embodiment of a privacy partition positioned over a seat.

FIG. 1 shows one embodiment of a privacy partition 100, which may also be referred to as an in-flight mother's room or privacy shade. The privacy partition 100 comprises a frame 101 that is covered in fabric or a flexible material 102, herein after referred to as fabric. The frame 101 has a collapsed configuration (shown in FIG. 4), which permits storage of the privacy partition 100, and an expanded configuration as shown in FIG. 1. In the expanded configuration, the frame 101 defines a perimeter within which a passenger may position a portion of their body while seated in a seat or chair. In particular, a portion of the frame 101 and/or fabric 102 may be selectively connected to a portion of a seat 10 to provide a temporary privacy partition 100 to a seated passenger. The seat 10 may be on a vehicle of public transportation to provide for some privacy for the passenger with respect to the adjacent passengers, or in some other public seating area. For example, the privacy partition 100 may be used on airplane, a train, a bus, and/or a boat or ship. The privacy partition 100 may provide privacy so that a mother could breast feed an infant, help calm a child while traveling, or put a traveler more at ease to permit more restful traveling. The privacy partition 100 may be used to provide privacy to a user seat in a public area such as a waiting room, boarding area, stadium, theater, restaurant, arena, terminal, or the like.

The privacy partition 100 may include a back 120, left side 140, right side 150, top 110, and a front 130. The privacy partition 100 may be positioned over the seat back 11 (shown in FIG. 2) of a seat 10 so that the back 120 of the privacy partition 100 is behind the seat back 11 as shown in FIG. 1. The back 120 of the privacy partition 100 could also be positioned in front of the seat back 11. The right side 150 and the left side 140 extend down from the top 110 to provide for privacy to a seat passenger. The ends of the left and right sides 140, 150 may terminate above an arm rest 13 of the seat 10. Alternatively, the left and right sides 140 and 150 may extend beyond the arm rest 13 and may be positioned in between arm rests 13 or outside of the arm rests 13. The privacy partition 100 may include one or more connectors 106 to selectively secure the privacy partition to a portion of a seat 10. For example, the connector 106 may be an elastic strap used to selectively secure the privacy partition 100 to the seat back 11 of the seat 10. Alternatively, the connector 106 may connect the privacy partition to other portions of a seat 10 such as to an arm rest 13.

Figure 2:
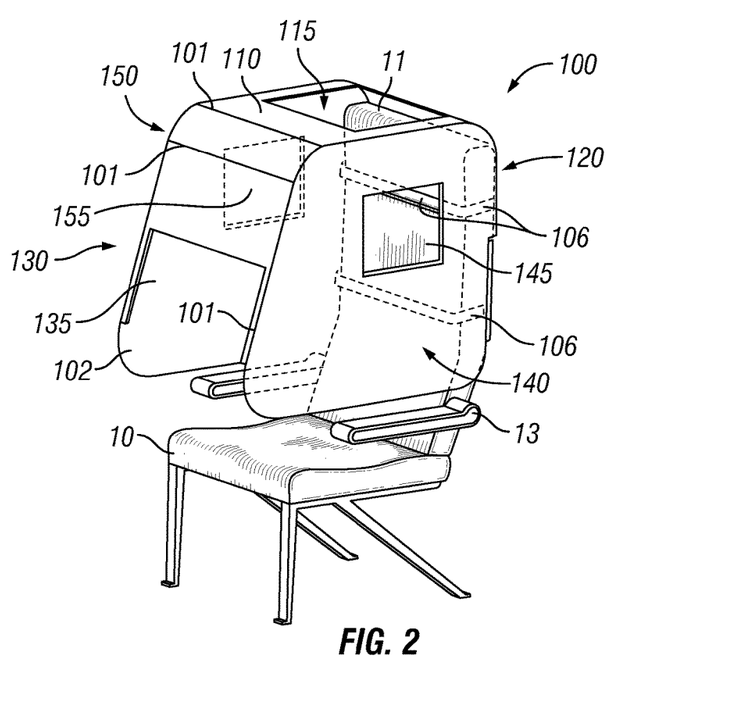
FIG. 2 shows a perspective view of one embodiment of a privacy partition positioned over a seat.
Figure 3:
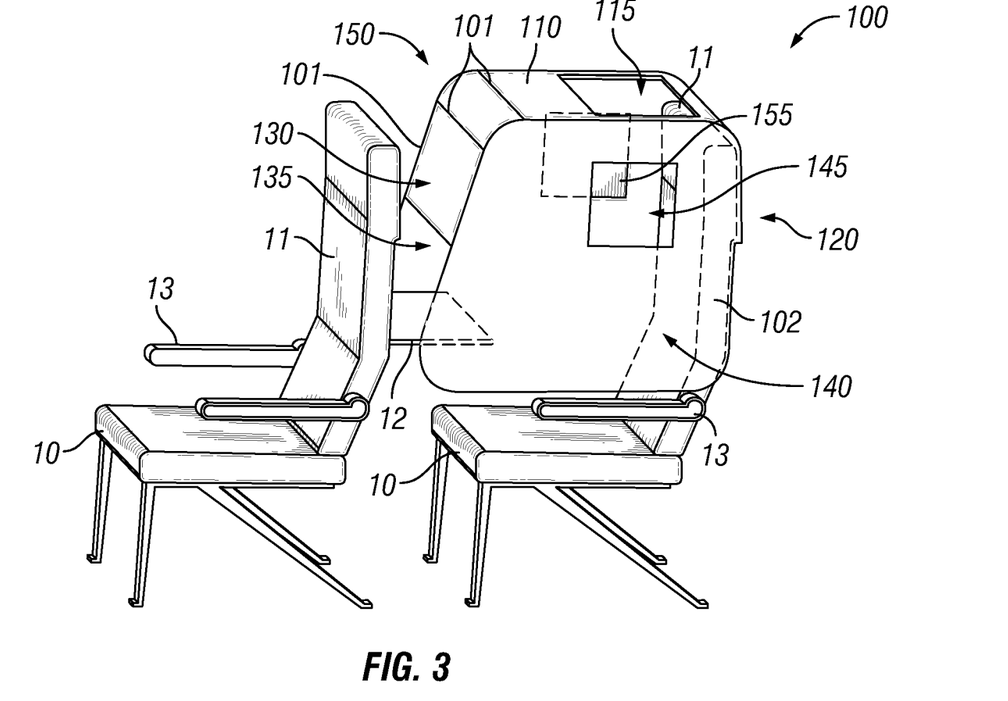
FIG. 3 shows a side view of one embodiment of a privacy partition positioned over a seat.

FIG. 2 shows one embodiment of a privacy partition 100 that is positioned over the seat back 11 of a seat 10. The front 130 may include a window or opening 135 that is configured to permit the ingress of a table tray 12 located on the back of an adjacent seat 10 as shown in FIG. 3. The privacy partition 100 may also include a window or opening 115 in the top 110, a window or opening 145 in the left side 140, and a window or opening 155 in the right side 150. The window or opening 155 in the right side 150 is shown in a closed configuration FIG. 2. Each of the window or openings 115, 135, 145, and 155 may be a flap or window that may be held in an open configuration and/or removed from the privacy partition 100. For example, a flap may be held in an open configuration via a hook and loop fastener or a tie. A flap or window could be connected to the privacy partition via a zipper and/or a snap and thus be removed from the privacy partition 100 to create the opening 115, 135, 145, and 155.

The privacy partition 100 may include at least one connector 106 that is used to connect a portion of the frame 101 and/or fabric 102 to a portion of a seat 10. The privacy partition 100 may include a plurality of connectors 106 that may be used to selectively connect the partition 100 to a seat 10. FIG. 2 shows a connector 106 on the interior of the partition 100 connecting the partition 100 to the seatback 11. The location, number, and configuration of the connector 106 is for illustrative purposes only and may be varied. Various connectors may be used to connect the partition to a portion of a seat 10 such as, but not limited to, hook and loop fasteners, snaps, elastic straps, fabric ties, clamps, strings, buttons, button holes, clips, buckles, clasps, rings, slides, d-rings, side-release buckles, and/or cords. Alternatively, the privacy partition 100 may be used adjacent to, but not connected to a portion of a seat 10.

Figure 4:
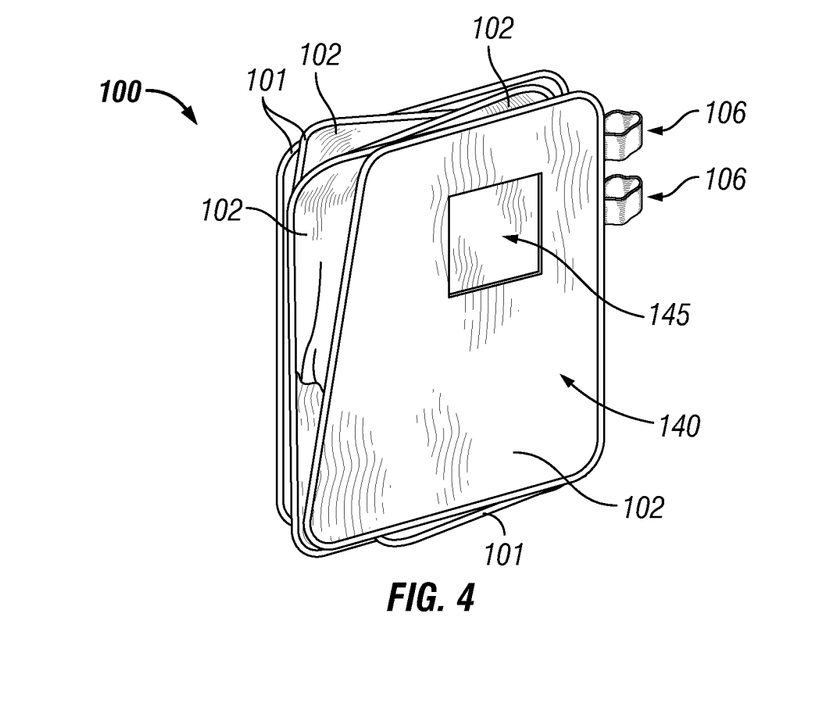
FIG. 4 shows one embodiment of a privacy partition collapsed for storage.

FIG. 4 shows an embodiment of a privacy partition 100 that is in the collapsed configuration. The frame 101 has been moved to a collapsed configuration permitting the reduction in size of the privacy partition 100 to permit the privacy partition 100 to be more easily stowed or stored in a compartment, backpack, or other container. The privacy partition 100 of FIG. 4 shows connectors 106 on an exterior portion of the partition 100 that may be used to connect the privacy partition 100 to a portion of a seat 10. Connectors on the outside of the partition 100 may permit the back 120 of the partition to be connected to a front of a seatback 11 of a seat 10. The privacy partition 100 may be stowed in a bin within a vehicle of public transportation in the collapsed configuration with the frame 101 moved to the expanded configuration when the privacy partition 100 is to be used by a passenger. Passengers may purchase or rent the privacy partition 100 while onboard public transportation. Alternatively, passengers may bring their own personal privacy partition 100 onboard stowed in a backpack or other carrying device until the passenger desires to use the privacy partition 100.

Figure 5:
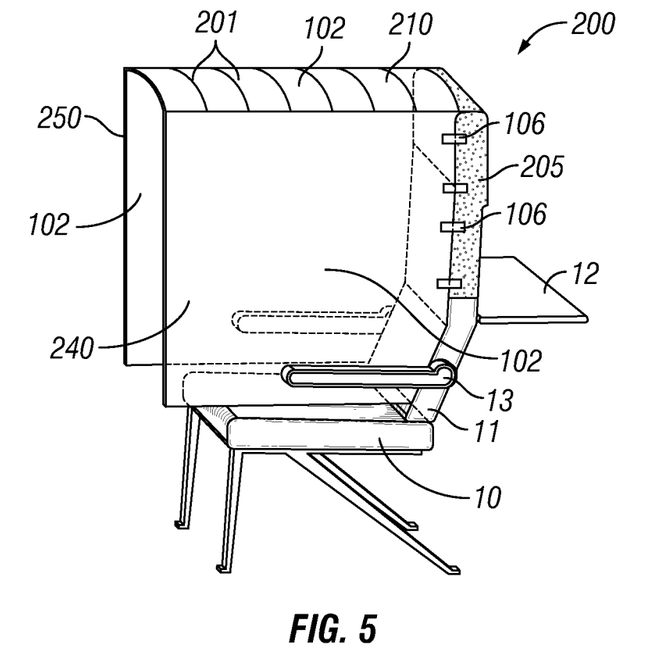
FIG. 5 shows a perspective view of one embodiment of a privacy partition connected to a seat.

FIG. 5 shows an embodiment of a privacy partition 200 that is selectively connected to a slip cover 205 via connectors 106. The privacy partition 200 is substantially similar to the privacy partition 100, except privacy partition 200 extends to the forward seat. As discussed above, various connectors 106 may be used to selectively connect the frame 201 or fabric 102 to the slip cover 205. The connectors 106 may be, but are not limited to, hook and loop fasteners, snaps, elastic straps, fabric ties, clamps, strings, buttons, button holes, clips, buckles, clasps, rings, slides, d-rings, side-release buckles, and/or cords. The slip cover 205 may be positioned over a seat back 11 prior to passengers boarding a vehicle. For example, upon purchasing a ticket on a public transportation vehicle, a passenger may also rent a privacy partition 200 for the duration of travel. Prior to boarding, slip covers 205 may be inserted over the back 11 of all seats 10 for which passengers have rented and/or purchased a privacy partition 200. Alternatively, the passenger may bring both the slip 205 as well as frame 201 covered in fabric 102 aboard the vehicle and install upon arriving at the passengers designated seat.

The frame 201 covered in fabric 102 may be selectively connected to the seat cover 205 via connectors 106. The number, location, and configuration of the connectors 106 are shown for illustrative purposes only and may be varied. The privacy partition 200 may include a left side 240 and a right side 250 that hang or drape down from a top 210. A frame 201 covered in fabric 102 may permit the privacy partition 200 to extend outward and away from the seat back 11. The privacy partition 200 may be opened in the front to permit passenger ingress and egress as well as to provide access to a tray table and seat back pocket.

Figure 6:
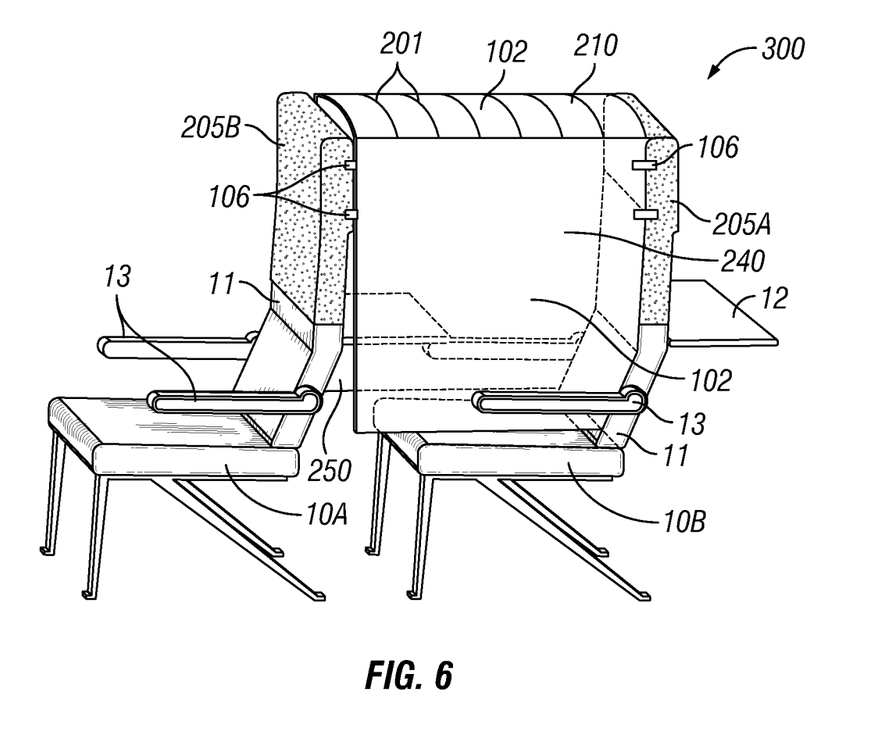
FIG. 6 shows one embodiment of a privacy partition connected between two seats.
Figure 7:
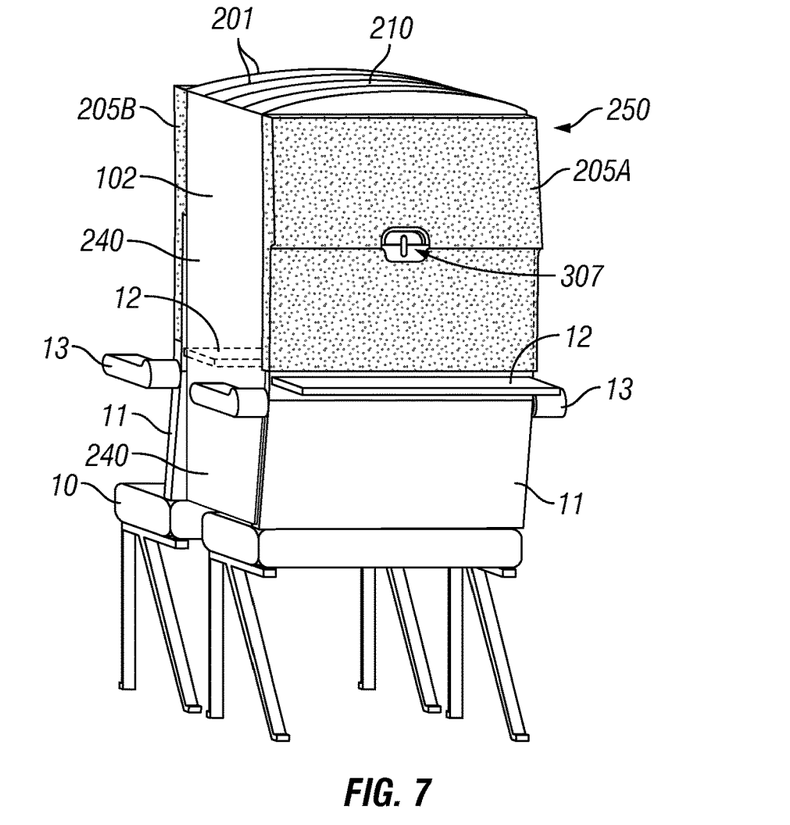
FIG. 7 shows a rear view of one embodiment of a privacy partition.

FIG. 6 shows one embodiment of a privacy partition 300 that includes a frame 201 covered in fabric 102 that extends between a slip cover 205A positioned on one seat 10A to a slip cover 205B positioned on an adjacent seat 10B. The privacy partition 300 is substantially similar to the privacy partition 100, except privacy partition 300 couples to two seats rather than a single seat. Connectors 106 may be used to selectively connect the frame 201 covered in fabric 102 to slip cover 205A and slip cover 205B. As discussed above, various connectors may be used to selectively connect the frame 201 and/or the fabric 102 to the slip covers 205A and 205B. The connectors 106 and/or the frame 201 covered with fabric 102 may be configured to permit either or both seats 10A and 10B to recline while the privacy partition 300 remains selectively connected to the seats 10A and 10B. The flexibility of the fabric 102, frame 201, and/or connectors 106 may permit privacy partition 300 to remain connected when a passenger of either seat 10A, 10B reclines. The left side 240 and the right side 250 hang or drape from the top 210 of the privacy partition 300. The left and rights sides 240 and 250 may be positioned in between or outside of the arm rests 13 of the seat 10. The frame 201, which may be flexible, permits the extension between the adjacent seats 10A and 10B and defines a perimeter within which a passenger may obtain some privacy from the adjacent passengers on a vehicle. The slip covers 205A and 205B may include an opening 307 that permits access to a tray table latch as shown in FIG. 7.

Figure 8:
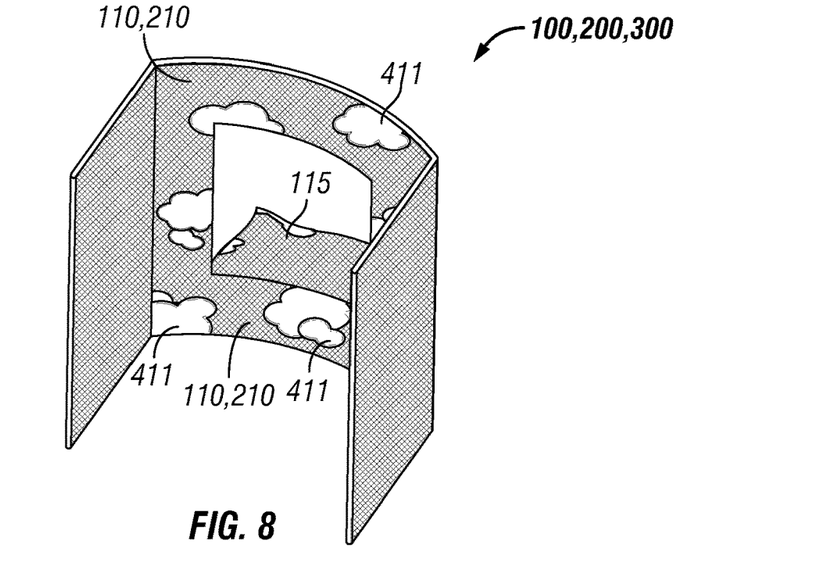
FIG. 8 shows an interior view of a portion of one embodiment of a privacy partition.

FIG. 8 shows an interior of any embodiment of a privacy partition 100, 200, 300 described herein. The interior of the top 110, 210 of the partition may include a soothing or aesthetically pleasing pattern 411. The pattern 411 shown as clouds is for illustrative purposes and may be any suitable pattern. The pattern 411 may be beneficial to calm an infant, small child, or passenger with special needs. The pattern 411 may partially cover a flap 115 in the top 110, 210 that may be used to selectively provide an opening or window in the top 110, 210.

Figure 9:
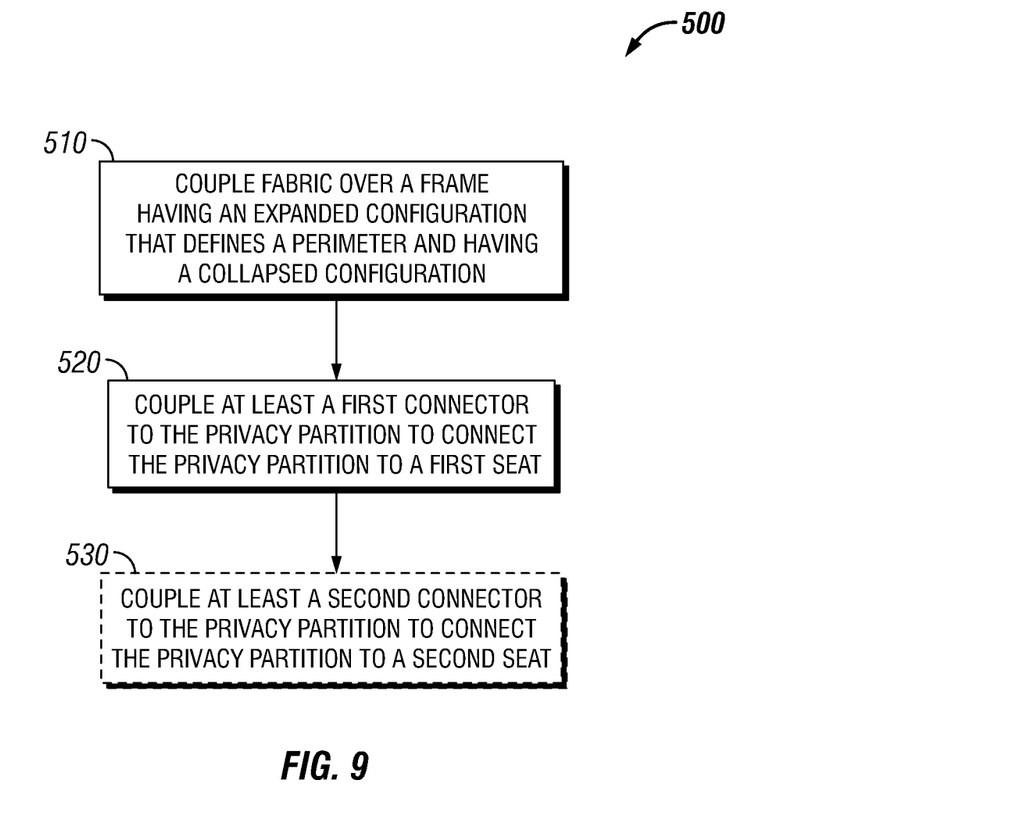
FIG. 9 shows a flow chart of one embodiment of a method of the present disclosure.

FIG. 9 shows a flow chart for a method 500 for making a privacy partition, such as privacy partitions 100, 200, and/or 300. For exemplary purposes, the method 500 is described with respect to the privacy partition 100, however, the method 500 can be used to make other embodiments of the privacy partition. The method 500 includes coupling fabric 102 over a frame 101 having an expanded configuration that defines a perimeter and having a collapsed configuration at step 510. The fabric 102 over the frame 101 in the expanded configuration provides a privacy partition 100. At step 520, the method 500 includes coupling at least a first connector 106 to the privacy partition 100 to connect the privacy partition 100 to a first seat 10. The method 500 includes the optional step 540 of coupling at least a second connector 106 to the privacy partition 100 to connect the privacy partition 100 to a second seat 10.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A privacy partition comprising:
   a frame covered in fabric, the frame having a collapsed configuration and an expanded configuration, wherein in the expanded configuration the frame defines a perimeter and wherein the frame extends about the perimeter, wherein the Frame covered, in fabric forms a bottom opening;
   a first connector, wherein the first connector selectively connects a portion of the privacy partition to a portion of a seat; and
   a second connector, wherein the seat connected by the first connector is an aft seat and wherein the second connector selectively connects a portion of the privacy partition to a portion of a fore seat, the frame covered in fabric extending between the aft seat and the fore seat.

2. The privacy partition of claim 1, wherein the first connector further comprises a hook and loop fastener, a snap, an elastic strap, a fabric tie, a clamp, a string, a button, a button hole, a clip, a buckle, a clasp, a ring, a slide, a d-ring, a side-release buckle, or a cord.

3. The privacy partition of claim 1, further comprising a first slip cover positioned over a seatback of the aft seat, wherein the first connector selectively connects the portion of the privacy partition to the first slip cover.

4. The privacy partition of claim 3, further comprising a second slip cover positioned over a seatbaek of the fore seat and wherein the second connector selectively connects the portion of the privacy partition to the second slip cover.

5. The privacy partition of claim 3, wherein the first slip cover further comprises a cutout configured to permit access to a tray table latch.

6. The privacy partition of claim 1, wherein the frame further comprises a wire.

7. The privacy partition of claim 1, wherein the frame covered in fabric further comprises a back, a top, a front, a left side, and a right side, wherein the back, the front, the left side, and the right side form the bottom opening.

8. The privacy partition of claim 7, further comprising at least one selectively closable opening in the top, at least one selectively closable opening in the left side, and at least one selectively closable opening in the right side.

9. The privacy partition of claim 7, further comprising at least one selectively closeable opening in the front configured to permit ingress of a tray table from an adjacent seat.

10. The privacy partition of claim 7, wherein the left side comprises a surface that extends from the top and wherein the right side comprises a surface that extends from the top.

11. The privacy partition of claim 10, wherein the front comprises a surface that extends between the left side and the right side.

12. The privacy partition of claim 1, further comprising an aesthetic pattern on at least an interior surface of the fabric.

13. The privacy partition of claim 1, wherein the first connector is connected to an interior portion of the privacy partition.

14. The privacy partition of claim 1, wherein the first connector is connected to an exterior portion of the privacy partition.

15. The privacy partition of claim 1, wherein the seat s on an airplane, train, bus, or boat.

16. The privacy partition of claim 1, wherein the frame is rigid.

17. A privacy partition system for an aircraft comprising:
an aft seat;
a fore seat; and
a frame covered in fabric that has a collapsed configuration and an expanded configuration, wherein in the expanded configuration the frame covered in fabric extends between the aft seat and the fore seat to define a perimeter for a privacy partition that is selectively connected to both the aft seat and the fore seat, wherein the frame extends about the perimeter and wherein the frame forms a bottom opening.

18. The system of claim 17, further comprising a first slip cover over the aft seat and a second slip cover over the fore seat, wherein the privacy partition connects to the aft, seat via the first slip cover and wherein the privacy partition connects to the fore seat via the second slip cover.

19. The system of claim 17, the privacy partition comprising a left side, a right side, and a top extending between the left side and the right side, wherein the left side is a surface that extends from the top and the right side is a surface that extends from the top, and wherein the frame comprises a plurality of members that extend along the top between the left side and the right side of the privacy partition.

20. A method comprising:
coupling fabric over a frame, the frame having an expanded configuration that defines a perimeter and a collapsed configuration, wherein the frame with the fabric in the expanded configuration provides a privacy partition and wherein the frame extends about the perimeter and forms a bottom opening;
coupling a first connector to the privacy partition to connect the privacy partition to a first seat; and
coupling a second connector to the privacy partition to connect the privacy partition to a second seat, wherein the privacy partition extends between the first seat and the second seat.

* * * * *